United States Patent
Che et al.

(10) Patent No.: US 6,824,923 B2
(45) Date of Patent: Nov. 30, 2004

(54) SECONDARY POWER SOURCE HAVING A LITHIUM TITANATE

(75) Inventors: Yong Che, Ann Arbor, MI (US); Manabu Tsushima, Yokohama (JP); Takeshi Morimoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 147 days.

(21) Appl. No.: 10/092,988

(22) Filed: Mar. 8, 2002

(65) Prior Publication Data

US 2002/0172865 A1 Nov. 21, 2002

(30) Foreign Application Priority Data

Mar. 9, 2001 (JP) ........................................ 2001-066658
Oct. 24, 2001 (JP) ........................................ 2001-326301

(51) Int. Cl.$^7$ ................................................ H01M 4/58
(52) U.S. Cl. ................................ 429/231.1; 429/231.4; 429/231.8; 429/231.9
(58) Field of Search ........................... 429/231.1, 231.4, 429/231.5, 231.9, 231.8

(56) References Cited

U.S. PATENT DOCUMENTS

| | | |
|---|---|---|
| 5,780,181 A | 7/1998 | Idota et al. |
| 5,953,204 A | 9/1999 | Suhara et al. |
| 5,998,063 A | 12/1999 | Kobayashi et al. |
| 6,103,373 A * | 8/2000 | Nishimura et al. ......... 428/368 |
| 6,294,292 B1 | 9/2001 | Tsushima et al. |
| 6,517,972 B1 * | 2/2003 | Amatucci ................. 429/231.1 |

FOREIGN PATENT DOCUMENTS

| | | | |
|---|---|---|---|
| EP | 0 938 109 | 8/1999 | |
| EP | 0 973 180 | 1/2000 | |
| JP | 2000-228222 | * 8/2000 | .......... H01M/10/40 |

OTHER PUBLICATIONS

Patent Abstracts of Japan, JP 63–121268, May 25, 1988.

U.S. patent application Ser. No. 09/266,871, filed Mar. 12, 1999, pending.

U.S. patent application Ser. No. 10/091,502, filed Mar. 7, 2002, pending.

* cited by examiner

*Primary Examiner*—Dah-Wei Yuan
(74) *Attorney, Agent, or Firm*—Oblon, Spivak, McClelland, Maier & Neustadt, P.C.

(57) ABSTRACT

A secondary power source, which comprises a positive electrode containing activated carbon, a negative electrode containing $Li_4Ti_5O_{12}$, and an organic electrolyte containing a lithium salt.

10 Claims, No Drawings

SECONDARY POWER SOURCE HAVING A LITHIUM TITANATE

The present invention relates to a secondary power source having a large discharge capacity and excellent charge and discharge cycle reliability at a large current.

As electrodes for a conventional electric double layer capacitor, polarizable electrodes composed mainly of activated carbon are used for both the positive electrode and the negative electrode. The upper limit voltage of an electric double layer capacitor is 1.2 V when an aqueous electrolyte is used, or from 2.5 to 3.0 V when an organic electrolyte is used. The energy of the electric double layer capacitor is proportional to the square of the upper limit voltage. Accordingly, an organic electrolyte having a high upper limit voltage provides a high energy as compared with an aqueous electrolyte. However, even with an electric double layer capacitor employing an organic electrolyte, the energy density is as low as at most 1/10 of a secondary cell such as a lead-acid battery, and further improvement of the energy density is required.

Whereas, JP-A-64-14882 proposes a secondary power source for an upper limit voltage of 3.0 V, which employs an electrode composed mainly of activated carbon as a positive electrode and as a negative electrode, an electrode having lithium ions preliminarily doped in a carbon material having a lattice spacing of [002] face of from 0.338 to 0.356 nm as measured by X-ray diffraction. Further, JP-A-8-107048 proposes a battery which employs, for a negative electrode, a carbon material having lithium ions preliminarily doped by a chemical method or by an electrochemical method in a carbon material capable of doping and undoping lithium ions. Still further, JP-A-9-55342 proposes a secondary power source for an upper limit voltage of 4.0 V, which has a negative electrode having a carbon material capable of doping and undoping lithium ions supported on a porous current collector which does not form an alloy with lithium.

A secondary power source which employs activated carbon for a positive electrode and a carbon material capable of doping and undoping lithium ions for a negative electrode, can be operated at a high voltage and has a large capacity as compared with a conventional electric double layer capacitor which employs activated carbon for both positive electrode and negative electrode.

Further, a lithium ion secondary cell which employs a lithium-containing transition oxide for a positive electrode and a carbon material for a negative electrode is available as a secondary power source with high performance other than the electric double layer capacitor and the above secondary power source. The lithium ion secondary cell has characteristics such that it can be operated at a high voltage and has a large capacity as compared with the electric double layer capacitor. However, it has had problems such that the resistance is high, and the useful life due to quick charge and discharge cycles is very short as compared with the electric double layer capacitor.

Both the secondary power source other than the above electric double layer capacitor and the lithium ion secondary cell have an upper limit voltage of at least 4.0 V, however, a useful capacity can be obtained within a voltage range of from the upper limit voltage to the vicinity of 2.7 V. Substantially no capacity can be obtained at a voltage of at most 2.7 V, and accordingly the secondary power source other than the above electric double layer capacitor and the lithium ion secondary cell can not be applied to a use with an operation voltage of at most 2.7 V.

Under these circumstances, it is an object of the present invention to provide a secondary power source which has quick charge and discharge capability and has a high energy density and which has a high charge and discharge cycle reliability.

The present invention provides a secondary power source, which comprises a positive electrode containing activated carbon, a negative electrode containing $Li_4Ti_5O_{12}$ and an organic electrolyte containing a lithium salt.

The present invention further provides a secondary power source, which comprises a positive electrode containing activated carbon, a negative electrode containing $Li_4Ti_5O_{12}$ and a carbon material capable of doping and undoping lithium ions, and an organic electrolyte containing a lithium salt.

Now, the present invention will be described in detail with reference to the preferred embodiments.

In this specification, a negative electrode assembly is one obtained by bonding and integrating a current collector and a negative electrode containing $Li_4Ti_5O_{12}$ capable of doping and undoping lithium ions. Likewise, a positive electrode assembly is one obtained by bonding and integrating a current collector and a positive electrode containing activated carbon. A secondary cell as well as an electric double layer capacitor is a kind of a secondary power source. However, in this specification, a secondary power source of a specific construction wherein the positive electrode contains activated carbon and the negative electrode contains $Li_4Ti_5O_{12}$ and/or a carbon material capable of doping and undoping lithium ions, will be referred to simply as a secondary power source.

With respect to lithium titanate represented by $Li_4Ti_5O_{12}$ having a spinel crystal structure, the charge and discharge potential is in the vicinity of 1.5 V relative to $Li^+/Li$ potential, whereas with respect to activated carbon of the positive electrode, polarization up to from 4.0 to 4.6 V is possible relative to $Li^+/Li$ potential. Accordingly, the upper limit voltage of a new secondary power source obtained by combining a positive electrode containing activated carbon and a negative electrode containing $Li_4Ti_5O_{12}$ is from 2.5 to 3.1 V, and the lower limit is 1.5 V.

The doping and undoping reaction of lithium ions to the carbon material takes place mainly within a range of from 1.0 to 0 V relative to the $Li^+/Li$ potential, and if the potential is at least 1.0 V, no capacity can be substantially obtained. Accordingly, in a case where a positive electrode containing activated carbon and a negative electrode containing a carbon material alone are combined, the effective operation voltage is within a range of from 4.6 V to 2.5 V. Namely, by incorporating $Li_4Ti_5O_{12}$ into the negative electrode, the lower limit of the operation voltage can be lowered. Further, a new secondary power source obtained by combining a positive electrode containing activated carbon and a negative electrode containing both carbon material and $Li_4Ti_5O_{12}$, operation can be carried out with a broad voltage range of from 4.6 V to 1.5 V.

Further, $Li_4Ti_5O_{12}$ has a spinel crystal structure wherein change in structure is small due to doping and undoping of lithium ions at the time of charging and discharging, and accordingly a secondary power source employing $Li_4Ti_5O_{12}$ as an active material of the negative electrode is stable and excellent in durability. On the other hand, in a case where a carbon material capable of doping and undoping lithium ions is used for the negative electrode, at the time of charging and discharging, a change in dimension takes place in a C axis direction of carbon crystals along with doping and undoping of lithium ions into between layers of the carbon material of the negative electrode. This change in dimension causes defects such that a coating on the carbon surface is broken or the bonding between carbon particles loosens, thus leading to decrease in capacity of the cell or to increase in the resistance.

According to further studies by the present inventors, it was found that by using as a negative electrode a mixed system of a carbon material and $Li_4Ti_5O_{12}$, deterioration by the negative electrode can be minimized, and charge and discharge cycle performance improve as compared with a negative electrode containing either the carbon material or $Li_4Ti_5O_{12}$ alone. The mechanism is not clearly understood yet, but it is considered that the potential at which the doping and undoping reaction of each of the carbon material and $Li_4Ti_5O_{12}$ takes place is within a potential range at which an irreversible reaction of the other material may take place, and accordingly a reversible doping and undoping reaction goes ahead, whereby the coulomb efficiency of the entire negative electrode improves, whereby charge and discharge cycle performance is improved.

Now, the secondary power source of the present invention is compared with an electric double layer capacitor and a lithium ion secondary cell below. In a case of an electric double layer capacitor, the positive and negative electrodes are both made of activated carbon, and when charged to 2.7 V, the discharge capacity per mass of the activated carbon of the positive and negative electrodes is about 30 mAh/g. On the other hand, the discharge capacity per mass of $Li_4Ti_5O_{12}$ is about 150 mAh/g, which corresponds to approximately 5 times the activated carbon. Further, with $Li_4Ti_5O_{12}$, the change in potential is very flat at the time of charging and discharging, and the capacity of the secondary power source can be brought out to the fullest extent, and accordingly a higher energy density can be obtained as compared with the electric double layer capacitor.

Further, in the lithium ion secondary cell, the positive electrode is an electrode composed mainly of a lithium-containing transition metal oxide, and the negative electrode is an electrode composed mainly of a carbon material capable of doping and undoping lithium ions. Lithium ions are undoped from the lithium-containing transition metal oxide in a positive electrode by charging and doped in the carbon material capable of doping and undoping lithium ions of a negative electrode, and lithium ions are undoped from the negative electrode by discharging and doped into the positive electrode. Accordingly, lithium ions in an electrolyte are not substantially involved in charge and discharge of the cell.

On the other hand, in the secondary power source of the present invention, anions in the electrolyte are adsorbed in the activated carbon in the positive electrode by charging, and lithium ions in the electrolyte are doped in $Li_4Ti_5O_{12}$ capable of doping and undoping lithium ions in the negative electrode. Further, by discharging, lithium ions are undoped from the negative electrode and anions are desorbed from the positive electrode. Namely, in the secondary power source of the present invention, the solute in the electrolyte is substantially involved in the charge and discharge, and the mechanism of the charge and discharge is different from the lithium ion secondary cell. Further, doping and undoping of lithium ions are not involved in the positive electrode of the secondary power source of the present invention, which is different from that of the lithium ion cell, and the positive electrode does not undergo deterioration due to doping and undoping of lithium ions. In the secondary power source of the present invention, in order to obtain stable cycle performance, it is required that the operation potential of the negative electrode is maintained in the vicinity of 1.5 V relative to the $Li^+$/Li potential, because if the negative electrode is overcharged, the potential tends to fall to at most 1.5 V, and further, if the potential is lower than 1.0 V, decomposition of the electrolyte may take place, thus leading to a decrease in capacity. In order to prevent overcharge of the negative electrode, it is necessary to make the capacity of the negative electrode larger than the capacity of the positive electrode.

Specifically, it is preferred that the capacity ratio of the negative electrode to the positive electrode {(capacity of the negative electrode)/(capacity of the positive electrode)} is within a range of from 1.05 to 1.8, particularly preferably from 1.05 to 1.3. If the above capacity ratio is lower than 1.05, if diffusion of Li ions in the $Li_4Ti_5O_{12}$ negative electrode does not catch up with the current at the time of large current discharging, the potential in the vicinity of the negative electrode tends to fall, thus leading to decomposition of the electrolyte. Further, if the capacity ratio is higher than 1.8, the energy density of the entire secondary power source tends to decrease. As described above, between the activated carbon and $Li_4Ti_5O_{12}$, the discharge capacity per mass of $Li_4Ti_5O_{12}$ is about 5 times larger, and accordingly the amount of the activated carbon in the positive electrode and the amount of $Li_4Ti_5O_{12}$ in the negative electrode may be adjusted so as to achieve the above capacity ratio.

In a case where the negative electrode contains both $Li_4Ti_5O_{12}$ and carbon material in the present invention, the proportion of $Li_4Ti_5O_{12}$ in the active material of the negative electrode is preferably from 20 to 50 mass %. The theoretical capacity per unit mass of $Li_4Ti_5O_{12}$ is about 150 mAh/g, which is at most half the theoretical capacity per unit mass of the carbon material (>300 mAh/g). Incorporation of $Li_4Ti_5O_{12}$ in an amount exceeding 50 mass % has an adverse influence on making the capacity high as a whole. If its amount is less than 20 mass %, no effect of improving cycle performance by a mixed system is likely to be obtained.

In a case where a carbon material is contained in the negative electrode, the carbon material is not particularly limited, and a carbon material having a lattice spacing $d_{002}$ of (002)face of from 0.335 to 0.410 nm as measured by an X-ray wide angle diffraction method is preferably used. Particularly preferred is a carbon material having a $d_{002}$ of from 0.345 to 0.390 nm, and particularly preferred is a hard (non graphitizable) carbon having a $d_{002}$ of from 0.370 to 0.380 nm, since its change in dimension along with charging and discharging is small, and it is stable even with an electrolyte composed mainly of propylene carbonate (hereinafter referred to as PC).

Further, the solvent in the electrolyte of the present invention may, for example, be PC, ethylene carbonate (hereinafter referred to as EC), butylene carbonate, dimethyl carbonate, ethylmethyl carbonate, diethyl carbonate, sulfolane or dimethoxyethane, and they may be used alone or as a mixed solvent of at least two. Among them, preferred is PC as a main solvent in view of compatibility with the activated carbon of the positive electrode, stability of the upper limit voltage, low temperature properties and the like. In a case where the $Li_4Ti_5O_{12}$ negative electrode or a mixed system negative electrode of a hard (non graphitizable) carbon and $Li_4Ti_5O_{12}$ is used, no electrolysis of PC which is typical on the negative electrode of hard (non graphitizable) carbon takes place in the PC solvent, and accordingly stable charge and discharge cycle performance can be obtained even in an electrolyte comprising PC as the main solvent.

The lithium salt contained in the organic electrolyte of the present invention is preferably at least one member selected from the group consisting of $LiPF_6$, $LiBF_4$, $LiClO_4$, $LiN(SO_2CF_3)_2$, $LiN(SO_2C_2F_5)_2$, $LiCF_3SO_3$, $LiC(SO_2CF_3)_3$, LiAsF$_6$ and LiSbF$_6$. The concentration of the lithium salt in the electrolyte is preferably from 0.1 to 2.5 mol/l, more preferably from 0.5 to 2 mol/l.

In the present invention, the solute of the electrolyte may consist of the lithium salt alone, but it is more preferred to use a mixture of the lithium salt and a quaternary onium salt. The electrolyte containing the lithium salt alone as the solute has a low electric conductivity, and accordingly there is such a tendency that the discharge capacity can not be made large in discharging at a large current density. On the other hand, in a case of an electrolyte containing a quaternary onium salt alone as the solute, since no lithium salt which is involved in charge and discharge is present, no charging and discharging can be carried out, and accordingly such an electrolyte can not be used for a secondary power source. By incorporating both lithium salt and quaternary onium salt, the electric conductivity of the electrolyte can be increased, and the capacity density of the secondary power source can be increased at a large current density discharging.

Here, the cation of the quaternary onium salt is preferably at least one member selected from the group consisting of $(C_2H_5)_3(CH_3)N^+$, $(C_2H_5)_4N^+$ and $(C_2H_5)_4P^+$. Further, the counter anion of the quaternary onium ion is preferably at least one member selected from the group consisting of $PF_6^-$, $BF_4^-$, $ClO_4^-$, $N(SO_2CF_3)_2^-$, $N(SO_2C_2F_5)_2^-$, $CF_3SO_3^-$, $C(SO_2CF_3)_3^-$ and $PF_3(C_2F_5)_3^-$.

In a case where a mixture of the lithium salt and the quaternary onium salt is used as the solute of the electrolyte, the amount of the lithium salt and the amount of the quaternary onium salt in the electrolyte are not particularly limited, but the molar ratio of (onium ions/lithium ions) is preferably from 0.3 to 2, whereby the electric conductivity of the electrolyte can be increased, and the internal resistance can be lowered. If the molar ratio exceeds 2, the amount of lithium ions in the electrolyte tends to be small, whereby the charge and discharge capacity hardly becomes large. On the other hand, if the molar ratio is less than 0.3, the effect of increasing the electric conductivity of the electrolyte by addition of the quaternary onium salt tends to be small. From the above viewpoint, the molar ratio is more preferably from 0.5 to 1.5.

The concentration of the solute of the organic electrolyte of the present invention is preferably such that the concentration of the cation is from 0.5 to 2.5 mol/l. If the concentration of the solute is less than 0.5 mol/l, the electric conductivity of the electrolyte tends to be low and the internal resistance tends to be high. On the other hand, if it exceeds 2.5 mol/l, the viscosity of the electrolyte may be too high. The concentration of the solute is more preferably from 0.75 to 2.0 mol/l. Here, in a case where the solute is a mixture of the lithium salt and the quaternary onium salt, for example, the concentration of the solute is the total of the concentration of the lithium salt and the concentration of the quaternary onium salt.

The activated carbon contained in the positive electrode of the present invention preferably has a specific surface area of from 800 to 3,000 m$^2$/g. The starting material and the activation conditions for the activated carbon are not particularly limited. For example, the starting material may be a coconut shell, a phenol resin or a petroleum coke, and the activation method may, for example, be a steam-activation method or a molten alkali activation method. In order to reduce the resistance of the positive electrode, it is also preferred to incorporate conductive carbon black or graphite as a conductive material into the positive electrode. In such a case, the conductive material is contained in an amount of preferably from 0.1 to 20 mass % in the positive electrode.

As a method for preparing the positive electrode assembly, a method may, for example, be mentioned, wherein polytetrafluoroethylene as a binder is mixed and kneaded with a mixture comprising an activated carbon powder and a conductive material, followed by forming into a sheet shape to obtain a positive electrode, which is then bonded to a current collector by means of a conductive adhesive. Otherwise, an activated carbon powder and a conductive material powder may be dispersed in a varnish having polyvinylidene fluoride, polyamideimide, polyimide or the like dissolved as a binder, and the dispersion may be coated on a current collector by e.g. a doctor blade method, followed by drying. The amount of the binder contained in the positive electrode is preferably from 1 to 20 mass % from the viewpoint of the balance between the strength of the positive electrode assembly and properties such as capacity.

In the present invention, $Li_4Ti_5O_{12}$ to be used for the negative electrode may, for example, be one obtained by mixing LiOH and TiO$_2$ in a molar ratio of 4:5, and baking the resulting mixture at a temperature of from 700 to 900° C. in an atmosphere of oxygen for about 10 hours. The specific surface area of $Li_4Ti_5O_{12}$ is preferably from 1.0 to 3.0 m$^2$/g. If it is smaller than 1.0 m$^2$/g, the effective area which contributes to an electrode reaction tends to be small, and accordingly the negative electrode may not be used for charging and discharging at a large current. On the other hand, if it is larger than 3.0 m$^2$/g, the active surface tends to be large, whereby the coulomb efficiency may decrease due to decomposition of the organic electrolyte at the surface.

The negative electrode assembly of the present invention can be obtained, in the same manner as the positive electrode, in such a manner that $Li_4Ti_5O_{12}$ is mixed with a conductive material such as carbon black or vapor grown carbon fibers, polytetrafluoroethylene as a binder is kneaded therewith, followed by forming into a sheet shape to obtain a negative electrode, which is then bonded to a current collector by means of a conductive adhesive.

In a case where a carbon material is incorporated in the negative electrode, the negative electrode assembly can be obtained in such a manner that a carbon material and $Li_4Ti_5O_{12}$ and a conductive material to be used as the case requires are kneaded, using polytetrafluoroethylene as a binder, followed by forming into a sheet shape to form a negative electrode, which is then bonded to a current collector by means of a conductive adhesive. Otherwise, a method may be mentioned wherein polyvinylidene fluoride, polyamideimide or polyimide is used as a binder, the carbon material and $Li_4Ti_5O_{12}$ and a conductive material to be used as the case requires are dispersed in a solution having the resin as the binder or a precursor thereof dissolved in an organic solvent, and the dispersion thus obtained is coated on a current collector and dried. Among these method, more preferred is a method of coating the dispersion on a current collector.

In the method for coating a liquid containing an active material on a current collector to obtain a negative electrode assembly, the solvent for dissolving the resin as the binder or the precursor thereof is not particularly limited. However, N-methyl-2-pyrrolidone (hereinafter referred to as NMP) is preferred, since it is readily available and capable of readily dissolving the resin constituting the binder or the precursor thereof. Here, the precursor for polyamideimide or the precursor for polyimide means one which will be converted to polyamideimide or polyimide, respectively, by polymerization under heating.

In the present invention, the mass ratio of the active material ($Li_4Ti_5O_{12}$ or a mixed system active material of the carbon material and $Li_4Ti_5O_{12}$) to the binder in the negative electrode is preferably from 70:30 to 96:4. If the amount of the binder is larger than 30 mass %, the negative electrode capacity tends to be small. If the amount of the binder is less than 4 mass %, the effect as the binder tends to be weak, whereby the separation of the negative electrode and the current collector tends to increase.

Now, the present invention will be explained in further detail with reference to Examples. However, it should be understood that the present invention is by no means restricted by such specific Examples.

The preparation of cells and the measurements in Examples 1 to 8 were carried out in an argon globe box with a dewpoint of at most −60° C. in all cases.

EXAMPLE 1

A mixture comprising 80 mass % of a $Li_4Ti_5O_{12}$ powder having a specific surface area of 2.0 $m^2/g$ obtained by mixing LiOH and $TiO_2$ in a molar ratio of 4:5, and baking the mixture thus obtained at 800° C. in an atmosphere of oxygen for 10 hours, 10 mass % of vapor grown carbon fibers and 10 mass % of polytetrafluoroethylene as a binder, was added to ethanol, followed by kneading, rolling and drying in vacuum at 150° C. for 2 hours to obtain an electrode sheet having a thickness of 150 µm. This sheet was further pressed by a roll pressing machine so that the area of the negative electrode was 1 cm×1 cm and the thickness was 50 µm, and bonded to a copper foil by means of a conductive adhesive using polyamideimide as a binder, followed by a heat treatment under reduced pressure at 150° C. for 10 hours to obtain a negative electrode assembly.

Then, a mixture comprising 80 mass % of activated carbon having a specific surface area of 2,000 $m^2/g$ obtained by steam-activation using a phenol resin as the starting material, 10 mass % of conductive carbon black and 10 mass % of polytetrafluoroethylene as a binder, was added to ethanol, followed by kneading, rolling and drying in vacuum at 200° C. for 2 hours to obtain an electrode sheet having a thickness of 200 µm. From this electrode sheet, an electrode of 1 cm×1 cm×200 µm was obtained and bonded to an aluminum foil by means of a conductive adhesive using polyamideimide as a binder, followed by a heat treatment under reduced pressure at 260° C. for 10 hours to obtain a positive electrode assembly.

The above positive electrode assembly and the negative electrode assembly thus obtained were disposed to face each other with a polypropylene separator interposed therebetween to obtain a secondary power source. A solution having $LiBF_4$ in a concentration of 1 mol/l dissolved in a mixed solvent of PC and ethylmethyl carbonate (mass ratio 1:1) was used as an electrolyte, and the above secondary power source was thoroughly impregnated with the electrolyte, whereupon the initial capacity was measured within a range of from 2.8 V to 1.0 V. Thereafter, a charge and discharge cycle test was carried out at a charge and discharge current of 10 $mA/cm^2$ within a range of from 2.7 V to 1.5 V, and the capacity after 2,000 cycles was measured, whereupon the change in capacity was calculated. The results are shown in Table 1.

EXAMPLE 2

A negative electrode assembly and a positive electrode assembly were prepared in the same manner as in Example 1 except that LiOH and $TiO_2$ were mixed in a molar ratio of 4:5, and the mixture thus obtained was baked in an atmosphere of oxygen at 850° C. for 10 hours to synthesize a $Li_4Ti_5O_{12}$ powder having a specific surface area of 1.5 $m^2/g$, and evaluation was carried out in the same manner as in Example 1. The results are shown in Table 1.

EXAMPLE 3

A negative electrode assembly and a positive electrode assembly were prepared in the same manner as in Example 1 except that LiOH and $TiO_2$ were mixed in a molar ratio of 4:5, and the mixture thus obtained was baked in an atmosphere of oxygen at 650° C. for 10 hours to synthesize a $Li_4Ti_5O_{12}$ powder having a specific surface area of 6.0 $m^2/g$, and evaluation was carried out in the same manner as in Example 1. The results are shown in Table 1.

EXAMPLE 4

A negative electrode assembly and a positive electrode assembly were prepared in the same manner as in Example 1 except that LiOH and $TiO_2$ were mixed in a molar ratio of 4:5, and the mixture thus obtained was baked in an atmosphere of oxygen at 650° C. for 10 hours to synthesize a $Li_4Ti_5O_{12}$ powder having a specific surface area of 0.6 $M^2/g$, and evaluation was carried out in the same manner as in Example 1. The results are shown in Table 1.

EXAMPLE 5 (COMPARATIVE EXAMPLE)

Using activated carbon for both positive and negative electrodes, the same negative electrode assembly and positive electrode assembly were prepared in the same composition and preparation method for the positive electrode of Example 1, and evaluation was carried out in the same manner as in Example 1. The results are shown in Table 1.

EXAMPLE 6

A mixture comprising 30 parts by mass of a $Li_4Ti_5O_{12}$ powder having a specific surface area of 2.0 $m^2/g$ obtained by mixing LiOH and $TiO_2$ in a molar ratio of 4:5, and baking the mixture thus obtained in an atmosphere of oxygen at 80° C. for 10 hours, 40 parts by mass of a hard (non graphitizable) carbon material having a lattice spacing $d_{002}$ of 0.380 nm and 10 parts by mass of vapor grown carbon fibers as a conducive material, was dispersed in a solution having 20 parts by mass of polyvinylidene fluoride dissolved in NMP, and the dispersion was coated on a current collector made of copper and dried to form a negative electrode on the current collector. This assembly was further pressed by a roll pressing machine so that the area of the negative electrode was 1 cm×1 cm and the thickness was 30 µm, followed by a heat treatment under reduced pressure at 150° C. for 10 hours to obtain a negative electrode assembly.

Then, a mixture comprising 80 mass % of activated carbon having a specific surface area of 2,000 $m^2/g$ obtained by steam-activation using a phenol resin as a starting material, 10 mass % of conductive carbon black and 10 mass % of polytetrafluoroethylene as a binder, was added to ethanol, followed by mixing, rolling and drying in vacuum at 200° C. for 2 hours to obtain an electrode sheet having a thickness of 200 µm. From this electrode sheet, an electrode of 1 cm×1 cm×200 µm was obtained and bonded to an aluminum foil by means of a conductive adhesive using polyamideimide as a binder, followed by a heat treatment under reduced pressure at 260° C. for 10 hours to obtain a positive electrode assembly.

The positive electrode assembly and the negative electrode assembly thus obtained were disposed to face each other with a polypropylene separator of a 80 µm thickness interposed therebetween to obtain a secondary power source. A solution having $LiBF_4$ in a concentration of 1 mol/l dissolved in a mixed solvent of PC and ethylmethyl carbonate (mass ratio 1:1) was used as an electrolyte, and the above secondary power source was thoroughly impregnated with the electrolyte, whereupon the initial capacity was measured within a range of from 4.2 V to 1.0 V. Thereafter, a charge and discharge cycle test was carried out at a charge and discharge current density of 10 $MA/cm^2$ within a range of from 4.0 V to 1.5 V, and the capacity after 2,000 cycles were measured, whereupon the change in capacity was calculated. The results are shown in Table 1.

EXAMPLE 7 (COMPARATIVE EXAMPLE)

A secondary power source was prepared and evaluated in the same manner as in Example 6 except that a mixture comprising 70 parts by mass of graphite (carbon material) having a lattice spacing of 0.337 nm and 10 parts by mass of vapor grown carbon fibers as a conductive material was dispersed in a solution having 20 parts by mass of polyvinylidene fluoride dissolved in NMP, and the dispersion was coated on a current collector made of copper and dried to form a negative electrode on the current collector, and except that the initial capacity was measured within a voltage range of from 4.2 V to 2.75 V, and the charge and discharge cycle test was carried out at a charge and discharge current of 10 $mA/cm^2$ within a range of from 4.0 V to 2.75 V. The results are shown in Table 1.

EXAMPLE 8

A secondary power source was prepared and evaluated in the same manner as in Example 6 except that a mixture comprising 40 parts by mass of a $Li_4Ti_5O_{12}$ powder having a specific surface area of 2.0 $m^2/g$, 30 parts by mass of a hard (non graphitizable) carbon material having a lattice spacing of 0.380 nm and 10 parts by mass of vapor grown carbon fibers as a conductive material was dispersed in a solution having 20 parts by mass of polyvinylidene fluoride dissolved in NMP, and the dispersion was coated on a current collector made of copper and dried to form a negative electrode on the current collector. The results are shown in Table 1.

TABLE 1

|  | Initial capacity (mAh) | Change in capacity (%) |
| --- | --- | --- |
| Example 1 | 2.13 | −6.6 |
| Example 2 | 2.04 | −6.7 |
| Example 3 | 1.87 | −14.6 |
| Example 4 | 2.08 | −18.2 |
| Example 5 | 1.45 | −6.8 |
| Example 6 | 2.52 | −5.8 |
| Example 7 | 2.24 | −24.8 |
| Example 8 | 1.98 | −6.2 |

EXAMPLE 9

The $Li_4Ti_5O_{12}$ powder obtained in Example 1 and graphitized vapor grown carbon fibers were dispersed in a 2-methyl-N-pyrrolidone solution of polyvinylidene fluoride (PVDF), and the dispersion was coated on a current collector having a thickness of 15 lum and dried to obtain a negative electrode assembly of lithium titanate:vapor grown carbon fibers: PVDF=70:10:20 (mass ratio). This was further pressed by a roll pressing machine so that the electrode size was 2.5 cm×4 cm and the thickness of the electrode layer was 32 $\mu$m, and this was used as a negative electrode assembly.

Then, a mixture comprising 70 mass % of activated carbon having a specific surface area of 800 $m^2/g$ obtained by a molten KOH activation method using a coke as a starting material, 20 mass % of conductive carbon black and 10 mass % of polytetrafluoroethylene as a binder, was added to ethanol, followed by kneading, rolling and drying in vacuum at 200° C. for 2 hours to obtain an electrode sheet. From this electrode sheet, an electrode of 2.5 cm×4 cm×150 $\mu$m was obtained and bonded to an aluminum foil by means of a conductive adhesive using polyamideimide as a binder, followed by a heat treatment under reduced pressure at 260° C. for 10 hours to obtain a positive electrode assembly.

The positive electrode assembly and the negative electrode assembly thus obtained were disposed to face each other with a polypropylene separator having a thickness of 80 u m interposed therebetween, and thoroughly impregnated with a PC solution containing 0.75 mol/l of $LiBF_4$ and 0.75 mol/l of $(C_2H_5)_3(CH_3)NBF_4$ for an adequate time to obtain a laminate packed cell as a secondary power source. The initial capacity density (mAh/$cm^3$) of this secondary power source was measured at a current of 10 mA (1.0 mA/$cm^2$) and 200 mA (20 mA/$cm^2$) within a range of from 2.7 V to 1.5 V. Thereafter, a charge and discharge cycle test was carried out at a charge and discharge current of 200 mA within a voltage range of from 2.7 V to 1.5 V at 45° C., and the capacity after 500 cycles was measured. The rate of decrease in capacity was calculated from {(initial capacity density)−(capacity density after 500 cycles)}/(initial capacity density). The results are shown in Table 2.

EXAMPLE 10

A secondary power source was prepared in the same manner as in Example 9 except that PC containing 1.5 mol/l of $LiBF_4$ alone was used as the electrolyte, and evaluated in the same manner as in Example 9. The results are shown in Table 2.

EXAMPLE 11 (COMPARATIVE EXAMPLE)

An electric double layer capacitor was prepared and evaluated in the same manner as in Example 9 except that the negative electrode was an electrode made of the same activated carbon as the positive electrode, and the electrolyte was PC containing 1.5 mol/l of $(C_2H_5)_3(CH_3)NBF_4$. The results are shown in Table 2.

EXAMPLE 12 (COMPARATIVE EXAMPLE)

A secondary power source was prepared in the same manner as in Example 9 except that a carbon material capable of doping and undoping lithium ions (tradename: MCMB6-28, manufactured by Osaka Gas Co., Ltd.) was used instead of the $Li_4Ti_5O_{12}$ powder to prepare a negative electrode, and a mixed solvent of ethylene carbonate and ethylmethy carbonate (volume ratio 1:1) containing 1.0 mol/l of $LiBF_4$ alone was used as the electrolyte, and evaluation has carried out in the same manner as in Example 9. The results are show in Table 2.

TABLE 2

|  | Initial capacity density | | Rate of decrease in capacity (%) |
| --- | --- | --- | --- |
|  | Discharge at 10 mA | Discharge at 200 mA |  |
| Example 9 | 6.74 | 4.74 | 5.7 |
| Example 10 | 6.83 | 3.89 | 5.3 |

TABLE 2-continued

| | Initial capacity density | | |
|---|---|---|---|
| | Discharge at 10 mA | Discharge at 200 mA | Rate of decrease in capacity (%) |
| Example 11 | 4.54 | 4.33 | 4.7 |
| Example 12 | 7.23 | 3.83 | 20.3 |

According to the present invention, a secondary power source at a level of 2.7 V having a large capacity and a high quick charge and discharge cycle reliability, can be provided. Further, by incorporating a carbon material capable of doping and undoping lithium ions as well as $Li_4Ti_5O_{12}$ into a negative electrode, the operation voltage range of the secondary power source can be broadened, and the capacity can be increased.

Further, by incorporating both lithium salt and quaternary onium salt as solutes in an electrolyte, the electric conductivity of the electrolyte can be increased, and the discharge capacity can be increased even in discharging at a large current density.

The entire disclosures of Japanese Patent Application No. 2001-66658 filed on Mar. 9, 2001 and Japanese Patent Application No. 2001-326301 filed on Oct. 24, 2001 including specifications, claims and summaries are incorporated herein by reference in their entireties.

What is claimed is:

1. A secondary power source which comprises (i) a positive electrode containing activated carbon, (ii) a negative electrode containing $Li_4Ti_5O_{12}$, vapor grown carbon fibers, and a carbon material capable of doping and undoping lithium ions having a lattice spacing $d_{002}$ of a (002) face of from 0.370 to 0.380 nm as measured by an X-ray wide angle diffraction method, and (iii) an organic electrolyte containing a lithium salt.

2. The secondary power source according to claim 1, wherein the electric capacity ratio of the negative electrode to the positive electrode is from 1.05 to 1.8.

3. The secondary power source according to claim 1, wherein $Li_4Ti_5O_{12}$ contained in the negative electrode has a specific surface area of from 1.0 to 3.0 $m^2/g$.

4. The secondary power source according to claim 1, wherein the lithium salt is at least one member selected from the group consisting of $LiPF_6$, $LiBF_4$, $LiClO_4$, $LiN(SO_2CF_3)_2$, $LiN(SO_2C_2F_5)_2$, $LiCF_3SO_3$, $LiC(SO_2CF_3)_3$ and $LiPF_3(C_2F_5)_3$.

5. The secondary power source according to claim 1, wherein the organic electrolyte contains a quaternary onium salt in addition to the lithium salt.

6. The secondary power source according to claim 5, wherein the quaternary onium salt contains at least one quaternary onium ion selected from the group consisting of $(C_2H_5)_3(CH_3)N^+$, $(C_2H_5)_4N^+$ and $(C_2H_5)_4P^+$, and at least one counter anion selected from the group consisting of $PF_6^-$, $BF_4^-$, $ClO_4^-$, $N(SO_2CF_3)_2^-$, $N(SO_2C_2F_5)_2^-$, $CF_3SO_3^-$, $C(SO_2CF_3)_3^-$ and $PF_3(C_2F_5)_3^-$.

7. The secondary power source according to claim 5, wherein the molar ratio of the quaternary onium ions to the lithium ions in the organic electrolyte is from 0.3 to 2.

8. The secondary power source according to claim 1, wherein the electrolyte comprises propylene carbonate.

9. The secondary power source according to claim 1, wherein the electrolyte comprises $LiPF_6$.

10. The secondary power source according to claim 1, wherein the positive electrode and negative electrode are separated by a polyolefin film.

* * * * *